(12) United States Patent
Papineau et al.

(10) Patent No.: US 10,964,215 B1
(45) Date of Patent: Mar. 30, 2021

(54) VEHICLE PARKING SPACE OCCUPANCY VERIFICATION AND USE AUTHORIZATION

(71) Applicants: Michel Papineau, East Toronto (CA); Mark Feltham, East Toronto (CA)

(72) Inventors: Michel Papineau, East Toronto (CA); Mark Feltham, East Toronto (CA)

( * ) Notice: Subject to any disclaimer, the term of this patent is extended or adjusted under 35 U.S.C. 154(b) by 0 days.

(21) Appl. No.: 16/694,599

(22) Filed: Nov. 25, 2019

(51) Int. Cl.
| | |
|---|---|
| G08G 1/00 | (2006.01) |
| G08G 1/14 | (2006.01) |
| G08G 1/01 | (2006.01) |
| G06Q 30/02 | (2012.01) |
| G06K 9/00 | (2006.01) |
| G06F 21/32 | (2013.01) |
| H04N 5/33 | (2006.01) |

(52) U.S. Cl.
CPC ............ *G08G 1/144* (2013.01); *G06F 21/32* (2013.01); *G06K 9/00832* (2013.01); *G06K 9/00885* (2013.01); *G06Q 30/0207* (2013.01); *G08G 1/0116* (2013.01); *G08G 1/146* (2013.01); *H04N 5/33* (2013.01)

(58) Field of Classification Search
CPC ...... G08G 1/144; G08G 1/0116; G08G 1/146; G06F 21/32; G06K 9/00832; G06K 9/00885; G06Q 30/0207; H04N 5/33
USPC ....................................................... 340/932.2
See application file for complete search history.

(56) References Cited

U.S. PATENT DOCUMENTS

| | | | | |
|---|---|---|---|---|
| 7,533,809 | B1* | 5/2009 | Robinson | G07F 17/244 |
| | | | | 235/382 |
| 2013/0344859 | A1* | 12/2013 | Abramson | H04M 1/72577 |
| | | | | 455/418 |
| 2014/0167985 | A1* | 6/2014 | Halnais | B60L 53/14 |
| | | | | 340/901 |
| 2014/0306826 | A1* | 10/2014 | Ricci | B60R 25/20 |
| | | | | 340/573.1 |
| 2015/0363986 | A1* | 12/2015 | Hoyos | G07C 9/00563 |
| | | | | 340/5.61 |
| 2016/0189324 | A1* | 6/2016 | Eramian | G06Q 10/02 |
| | | | | 705/13 |
| 2017/0293910 | A1* | 10/2017 | Tinskey | G06Q 20/3674 |
| 2018/0039974 | A1* | 2/2018 | Powell | G07F 17/24 |
| 2018/0374126 | A1* | 12/2018 | Patil | G07C 5/008 |
| 2019/0213576 | A1* | 7/2019 | Borras | G06Q 20/145 |
| 2019/0279447 | A1* | 9/2019 | Ricci | B60R 25/25 |
| 2020/0090203 | A1* | 3/2020 | Reichenbach | G06Q 30/0217 |
| 2020/0111361 | A1* | 4/2020 | Witten | G06K 9/325 |
| 2020/0167365 | A1* | 5/2020 | Troia | G06F 16/1834 |

\* cited by examiner

*Primary Examiner* — Zhen Y Wu
(74) *Attorney, Agent, or Firm* — John L. Sotomayor

(57) ABSTRACT

The present invention is a method and system to verify the availability of and qualification for parking and ride-sharing incentives. In an embodiment the present innovation uses a variety of technologies to reliably count the number of live humans purportedly in a given vehicle and ascertain their simultaneous co-location. The present invention may be used to implement means-based incentive programs for registered users of modest means. The described system may use, by way of non-limiting example, mobile communications devices such as cell phones, tablets, smart phones, or transponders, each of which may be incidental to or integrated within a given vehicle.

18 Claims, 9 Drawing Sheets

US 10,964,215 B1

VEHICLE PARKING SPACE OCCUPANCY VERIFICATION AND USE AUTHORIZATION

CLAIM TO PRIORITY

This Non-Provisional application claims under 35 U.S.C. § 120, the benefit as a Continuation In Part of the non-Provisional application Ser. No. 15/878,308, filed Jan. 23, 2018, Titled "Vehicle Parking Space Occupancy Verification and Use Authorization" which is hereby incorporated by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Many municipalities and private organizations struggle with managing motor vehicle commuter use of the finite number of parking spaces available in any particular lot, community, or jurisdiction. At the same time, commuters driving cars, vans, sport utility vehicles and the like, struggle to find open and available parking spaces in popular locales.

Separately, municipalities and private organizations may desire to reserve parking spaces in choice locations as "rewards" for certain individuals or to serve as consideration in a pay-per-use revenue generating scenario.

In order to reserve and manage parking spaces, some entities have employed static signage to indicate that select spaces are considered to be "reserved" for use only during certain hours or only by vehicles bearing certain indicia of privilege, such as a decal or tag placed prominently in or on the authorized vehicle. Such a system requires active policing for non-compliance, such policing often taking the form of physical parking wardens who, while performing a circuit of all parking spaces in a given area, write citations to unauthorized users or take other corrective action.

Other entities employ physical barriers such as walls or toll gates to limit access to privileged parking areas. By tracking the number of vehicles granted admission to such areas and by ensuring that the number admitted in any particular interval does not exceed the maximum number of available spaces, entities can guarantee that drivers of admitted vehicles will secure suitable parking.

Just as parking space management can prove difficult for municipalities to effect, so the creation of incentives to encourage ride-sharing programs can be. More and more Department of Transportation (DOT) jurisdictions seek to create incentives for carpooling such as access to High Occupancy Vehicle (HOV) lanes on public highways. Such HOV lanes permit use only when a vehicle is being used to transport multiple occupants. One of the challenges with dedicating a lane to such "carpooling", particularly in the introductory phase when there are not many carpoolers, is the resulting, and politically unpopular, increased congestion in the remaining, regular lanes.

To help mitigate this issue, many jurisdictions are introducing HOV lanes as High occupancy/OR Toll (HOT) lanes (also known as Express Lanes) to provide paid access to the lanes for single-occupant vehicles. While paid access to HOT lanes can be less democratic than access to lanes based solely upon occupancy, use of HOT lanes can be more politically acceptable. This is because overall traffic congestion resolution theoretically becomes self-regulating: some drivers will opt to pay a toll to access a reserved lane when congestion is high.

An additional carpooling incentive can take the form of access to private toll roads, with such access also being based upon paid admission. While carpooling can erode the profitability of toll highways, the availability of carpooling on private toll roads can help to alleviate overall traffic volume while simultaneously leading to lower road maintenance and lane expansion costs.

One of the biggest challenges in a municipality's introduction of a carpool lane is its being able to enforce a carpool occupancy requirement and, in the case of HOT lane access, although the system may know the identity of the party to be billed for HOT lane occupancy access, the validation of occupants in a vehicle with any accuracy is currently dependent upon an honor system where users self-declare their occupancy count and the validation count is accepted on that basis. Additionally, while technology exists to capture a photo from an exterior camera as a vehicle passes by the exterior camera and use this photo as confirmation to determine occupancy, these technologies often produce questionable confirmations that subsequently require human operator intervention post lane-access. Periodically, such technologies lead to incorrect billing, resulting in a costly and time-consuming review process.

Alternatively, drivers may employ transponder-based systems that require driver input prior to beginning a shared ride. Before approaching a verification point, a driver using a transponder system must remember to indicate carpool activity, usually by activating a switch on his transponder. In some cases, the driver may shield his transponder so that an LPR system can read the license plate so that the LPR system may intervene before billing takes place. In this case, the license plate number and sometimes carpool sticker on the back of the car are photographed by a camera operated by the LPR system. The photographs may be verified against a prequalified carpool user list and if a match is found an exception is made. This reliance on driver action to trigger an exception can lead to system failure in cases where a driver fails to timely or properly indicate carpool activity.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
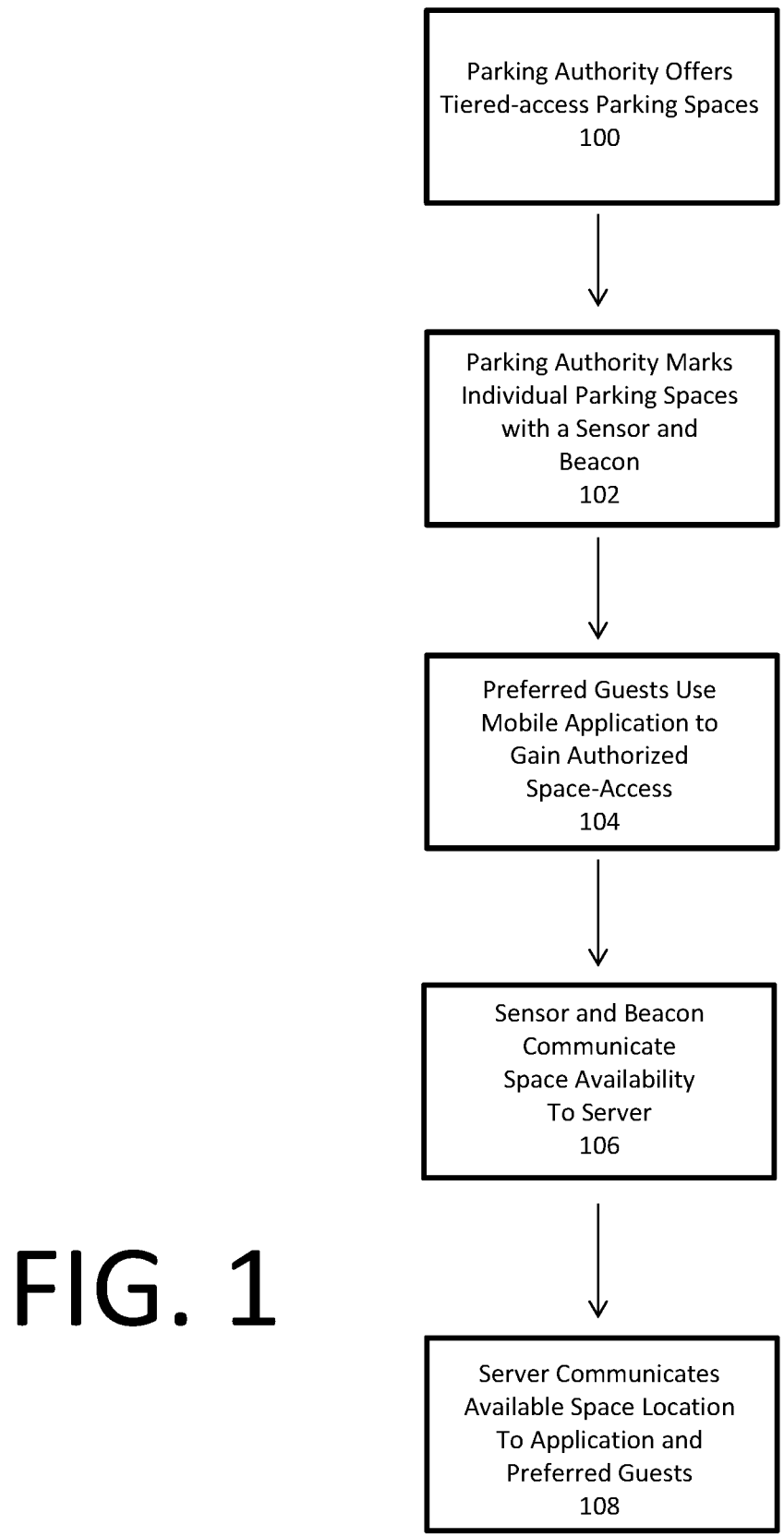
FIG. 1 is a system diagram for an exemplary system operation consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference herein to "device" indicates electronic devices that include a radio frequency (RF) transmitter, and contemplate but are not limited to include a mobile phone, a laptop, an electronic tablet, or any personal digital assistance device.

Reference herein to "GPS" indicates reference to the Global Positioning System space-based radio-navigation satellite array and associated technologies.

Reference herein to "Tiered-access" indicates physical spaces differentiated in permissive occupation by privileged drivers based upon pre-determined criteria.

References herein to "sensor" include, but are not limited to, presence-detection devices based on optic detection principles, magnetic detection principles, or a combination of optic and magnetic detection principles. Each sensor may have a wireless broadcast capability for data communication with other devices.

References herein to "beacon" refer to a wired or wireless broadcast device such as, by way of non-limiting example, i-beacon or eddystone.

References herein to "device" indicate electronic devices that include, but are not limited to, a radio frequency (RF) transmitter, a mobile phone, a laptop, an electronic tablet, or any personal digital assistance device.

Reference to "verification" indicates an objective process for confirming user input to a device.

Reference to "validation point" indicates any physical location where a request for verification could be made.

Reference to "rewards" indicates special privileges or access to special privileges that result from successful verification of user input.

References to "photo" indicate a digital visual representation of a vehicle's passenger area.

References to "GPS" indicate reference to the Global Positioning System (GPS) space-based radio-navigation satellite array and associated technologies.

References to "riders" or "multiple riders" in a vehicle refers to 2, 3, or more riders depending upon the capacity of the vehicle.

Reference to "Probability of Distinction" indicates the estimated likelihood that a candidate individual's biometric pattern does not match the biometric pattern of a base individual.

Reference to "HOV" indicates "High-Occupancy Vehicle" and is traditionally used to indicate certain vehicle lanes that are accessible only by vehicles carrying a minimum number of passengers.

Reference to "HOT" indicates when a municipality permits vehicles that do not meet occupancy requirements to nonetheless use certain vehicle lanes through the paying of a toll.

Reference herein to "BLE" refers to Bluetooth Low Energy, a form of short-range wireless communication.

In order to offer public parking, municipalities and private entities are often faced with the need to maximize the availability of a finite and coveted resource. Because of their physical size, the number of parking spaces for motor vehicles in a particular area is inherently limited by the size of the motor vehicles and the size of the area in question. Thus, when demand for parking in a given locale outstrips supply, rationing access to those spaces becomes a necessity.

This necessity is compounded in the case where municipalities or private entities intend to offer certain select parking spaces to an authorized subset of the driving public. For instance, some entities may desire to offer parking spaces located close to a building entrance to the elderly or disabled. Others may desire to offer spaces near a business based upon paid access only, or as a perk for loyal customers or employees. In fact, entities may desire to reserve parking spots for any number of customers determined to be "privileged": expectant mothers, parents with small children, those drivers who have received a privileged parking space as an award or reward, or valet parking "VIP" drivers.

In order to ration such a finite resource as desirable parking spaces, entities must create a physical or procedural infrastructure to police for unauthorized use of parking spaces. Municipalities have historically chosen to use such costly physical infrastructure as walls or toll gates, while using procedural infrastructure such as selling indicia of authorization and hiring human monitors to look for vehicles not bearing such indicia and towing offending vehicles or levying fines on associated drivers.

Simultaneously, drivers seeking parking spaces are often at a disadvantage in finding a single authorized space within a set number of spaces with varying permission requirements. For instance, the holder of an exemplary authorized parking permit "A" may be stymied by the availability of parking spaces allowing occupancy only to holders of parking permits "B," "C," or "D." Likewise, once granted access to a parking lot within which an authorized space is available, drivers still face the task of locating the particular one or more spaces within what may be a large combined pool of authorized and unauthorized spaces.

Consequently, a need exists for a system and method for verifying that a particular parking space is unoccupied, communicating the availability of that particular space to the municipality and authorized drivers, and upon subsequent occupancy, confirming that the occupying vehicle is authorized to occupy the space.

Urban and suburban dwellers often seek shared transportation options for reasons as diverse as economy in travel expenses, shared responsibility in vehicle operation, and human companionship during a commute. In metropolitan areas where traffic congestion is rife, local authorities often incentivize shared transportation options in order to relieve traffic congestion and reduce expensive road maintenance. Setting aside special travel lanes for multi-occupant "carpooling" vehicles is one such incentive that municipalities employ. Vehicles with certain established occupancies are permitted unfettered access to lesser-travelled High Occupancy Vehicle (HOV) or High Occupancy/Toll (HOT) lanes, theoretically minimizing travel delays due to traffic congestion. Such delay minimization is a coveted reward for those who choose to carpool.

Because of the desirability of designated HOV and HOT lane access, municipalities must adopt systems and procedures to track, prevent and manage abuse of such lane access. Existing systems of ensuring compliance with rules regarding High Occupancy lane access rely on self-reporting, photographic verification, or post-billing adjudication.

In an embodiment, the invention described herein is a method of verifying vehicle occupancy by establishing communication between a server and one or more mobile devices, determining the physical locations of each of said mobile devices, verifying said mobile devices are co-located, determining whether said proximity conforms to one or more pre-determined values, delivering communications from the server to a secondary server (like one operated by or on behalf of a regulatory body), and delivering communications from the server to said mobile devices. Verification of vehicle occupancy may be affected through analysis of one or more photographic representations of the vehicle passenger compartment and/or photographic images of each individual within the passenger compartment of a vehicle.

In an alternate embodiment of the invention, a system of verifying commuter vehicle occupancy is described. The system may include a user interface, a server having a processor in wireless communication with one or more mobile devices, and a software module operative to determine the physical locations of the mobile devices. In use, the server verifies co-location of the mobile devices, delivers communications from the server to a secondary server (like one operated by or on behalf of a regulatory body), and delivers communications from the server to a user interface display on any one of the mobile devices.

The system and method described herein identifies vehicle occupancy and location as a natural product of the RideFlag® transportation application. The application confirms the presence of two or more occupants when drivers and riders simply use the app to match prospective drivers with prospective riders. When used with respect to HOT or HOV lane access, RideFlag® provides the platform to collaborate with jurisdictions and Toll Highway operators to confirm vehicle occupancy.

In an embodiment, the invention described herein is a mobile-device application that uses user interfaces, geofence locations, and sensors, with or without electronic beacons to verify occupancy of a vehicle either on a transit pathway, such as a road, highway, HOV lane or other transit pathway, or within a parking facility to provide for an award, reward, recognition, or other incentive to utilize the identified transit pathway or parking facility. In a non-limiting example, for a parking facility the mobile-device application may verify that a particular parking space is unoccupied, communicate such unoccupied and available status to parking authorities and authorized users, that a vehicle meets the condition to be authorized to use a particular parking space, confirm subsequent authorized use and in the case of unauthorized use, notify parking authorities for corrective action.

In a non-limiting specific example, the passengers in a vehicle may receive preferential parking in areas designated for members of the RideFlag system who enter one or more areas delimited by a geofence location. As the vehicle containing RideFlag users enters a geofenced location, parking lot, or other designated physical area designated as a parking area, the RideFlag system may validate parking permission based on a carpooling effort tracked and confirmed at location via a geofence in combination with validating the driver and all passengers co-located within the vehicle. Upon physically encountering a validation point, the devices associated with the driver and all passengers in a vehicle may transmit a verification of location when entering an area delimited by a pre-determined geofence. In a non-limiting example, upon successful validation and award determination users may be given a reward or incentive, such as a permit for preferred parking, when entering a geofenced parking area located at an office building. The driver and passengers may receive a message on their mobile devices that the vehicle in which they are traveling as members of a validated carpool may now park at a preferred parking area, and in a preferred parking space. In an embodiment, a preferred parking area or facility may have a designated section or dedicated parking slots exclusively for the use of RideFlag users. The RideFlag system will have received information about a carpool vehicle that has been validated and issued an award for parking in the reserved area, and will manage the inventory of such parking slots available and occupied as vehicles enter and exit the parking area associated with a particular geofence. The RideFlag system may send a report to the company providing the reserved parking slots to verify that authorized carpooling vehicles have accessed the parking area. The company or a Parking Authority providing the reserved parking area may utilize the report to manage the number of parking awards and number of vehicles parked in the reserved area.

In a non-limiting example, a vehicle parked in a sensor-monitored parking spot may trigger one or more sensors associated with the parking spot when a vehicle activates the one or more sensors. Sensor-monitored parking spots may be located within a pre-determined geofenced area and the sensors may be active to verify the award or authorization of any particular vehicle to park in the reserved parking area maintained by a Parking Authority. The Parking Authority may provide tiered-access parking spaces to users of a preferred parking system such as, in a non-limiting example, the RideFlag system. A RideFlag central server communicates with one or more sensors to determine space availability for assignment of available spaces to authorized users of the system to whom awards have been granted. Additionally, the RideFlag central server continuously monitors the inventory of available parking spaces, their location, and any premiums associated with the parking spaces for incentives that may be provided to authorized users. The sensor may provide an indication that the previously empty parking spot is now occupied by a vehicle.

In an embodiment, the RideFlag server may determine if there are cars associated with one or more system users that may be geographically within range to receive a transmission from an activated beacon. Upon determining a parking spot is occupied by a vehicle, the sensor may activate a beacon for a set time period, such as, in a non-limiting example, for one minute. When used, the beacon broadcasts a unique code in a very short range to permit a user smart-phone application to collect the beacon signal and report the signal indication to the RideFlag system server. If there are cars associated with one or more users in the area, the RideFlag system may request users within the car be validated as occupying the vehicle and validated as persons and not images or other representations.

In an embodiment, the validation may require users within the cars that are within range of the activated beacon signal and/or within range of the one or more sensors associated with the parking space, to respond to a message from the RideFlag server. Alternatively, where sensors or beacons are not active in the parking facility or area, the RideFlag server may request that the driver or other occupants of the vehicle provide an image through one or more of the mobile devices associated with the occupants of the vehicle, or an image capture device associated with the vehicle itself. The image may be analyzed by the RideFlag server to verify that individuals within the image are natural persons. In a non-limiting example, identifying micro or small motions of the individuals within the image provides this assurance of natural persons, verifying that the individuals in question are within the vehicle and are not still images or other representations. Additionally, an infrared sensor may be utilized in combination with a camera to capture both an image and heat signature for each individual, providing validation that the individuals are occupying the vehicle and that the image represents natural persons.

Upon validation, regardless of the form the validation takes or is required of the driver or other occupants of the vehicle, the RideFlag server may transmit a message to a user, the driver, asking if the car associated with the driver is currently parked in the recently occupied parking spot. If the user replies in the affirmative, the RideFlag server next determines if the user is authorized to park in the occupied spot based upon a parking award or other parking authorization provided to the user from the RideFlag server. If the user is authorized, the RideFlag system uses this affirmative reply as verification that an authorized RideFlag system user is parked in the occupied spot. The RideFlag system then flags the space as being occupied by an authorized user, updates the user log with the parking notification and reports the authorized use of the parking spot to a parking authority.

Also, if the RideFlag user has been provided with this parking spot as a reward or incentive by the RideFlag system, the RideFlag server will flag the parking slot as occupied by an authorized user having an incentive for use of the parking slot, along with a timestamp as to the start time of the occupation. The timestamp may be associated with entry into a geofenced area, activation of a sensor associated with a parking area, and/or activation of a beacon associated with one or more parking spots. The RideFlag system will manage and maintain the inventory of such incentive-based parking slots and the users who have been awarded such incentives.

In a non-limiting example, if no mobile device belonging to an authorized parking candidate is co-located within a geofenced area, with a sensor, or sensor and beacon combination, the server may determine that the vehicle occupying the parking spot is not authorized to park in the occupied spot. If the user is a member of the RideFlag system, but the user has not been validated and is not authorized to park in the indicated slot, the RideFlag system may then transmit a warning message to the user, that they are not authorized to park in the occupied parking spot for this trip and request that they move from the parking spot. If the car is not authorized to occupy the parking spot, or the user is a member of the RideFlag system but is not authorized to occupy the parking spot and the vehicle has not moved from the parking spot, the server may directly notify parking enforcement for tagging or towing, depending on pre-determined enforcement protocol.

In an embodiment, whether an original occupying vehicle is authorized or unauthorized to occupy a given parking spot, once it is removed from the spot, or the vehicle is moved out of an area bounded by a pre-determined geofence location, the movement, sensors, or sensor and beacon in combination allow for real-time return of the parking spot to available parking spot inventory maintained within the RideFlag central server. In a non-limiting example, the movement of a vehicle out of a geofenced area provides an indication to the RideFlag server that a parking spot in the geofenced area is no longer occupied and is returned to the unoccupied inventory for that given geofenced area. In another non-limiting example, a sensor associated with a parking spot within a designated parking area transmits a message to the RideFlag server to indicate that the parking space is once again unoccupied and available. As such, a subsequent authorized parking candidate may be directed to the now-open-spot by receiving communications via the associated RideFlag mobile application on his or her mobile device.

In an embodiment, the mobile application of the instant innovation may be embedded in any other mobile application to allow for the validation and delivery of an award to an individual within a vehicle. In a non-limiting example, the reward may be provided to an enhanced pool of authorized parking candidates. Such embedding in other mobile applications may be used by third parties on third party applications to offer rewards, such as privileged parking access and/or other rewards and incentives, within the third parties' own platform and using the third party's own branding.

The combination of geofenced designation, a sensor, or sensor coupled with a beacon, a mobile-device application, and a server with tracking, geo-location, inventory management, and real-time messaging to parking authorities can allow municipalities and private entities to award incentives and rewards such as privileged parking to qualification-verifiable drivers through the use of the disclosed system and process.

The system may also allow drivers to receive privileges, incentives, and/or rewards based upon pre-determined criteria, and may allow parking enforcement authorities to raise additional revenue through fines levied against vehicles parked where unauthorized to do so.

In an embodiment, a physical parking space locking device may be controlled with local BLE code and is triggered by a user's cell phone when in close range. The code is dynamically reset after each time the space is occupied and then newly vacated. The physical parking space locking device is mounted on the space pavement, communicates with a RideFlag® server via localized LoRa protocol, and self-reports its open or closed status. The physical parking space locking device includes a sensor to recognize when a car has vacated the space, a mechanism to close a gate to keep the space reserved, and on-board BLE capability to permit remote opening by a qualified user's phone.

In an embodiment, while sensors such as transponders or other sensors associated with a vehicle may identify the vehicle, the RideFlag® system identifies and validates vehicle occupancy and location. In an embodiment, the RideFlag® system confirms the presence of two or more occupants within a single vehicle when drivers and riders use the application on HOV/HOT lanes, even for rides with no other incentive than access to the HOV/HOT lane toll free. The RideFlag® system provides the platform to collaborate with Toll Highway operators and jurisdictions managing all vehicle road access, including, in non-limiting examples, access to non-highway tolls, bridges, and any other road or traffic situation in which the validation and confirmation of vehicle occupancy is important or required.

In an exemplary embodiment, riders and drivers may use the RideFlag® application to establish carpools on an as-needed basis with no carpool registration required. The RideFlag® system is totally dynamic in that carpools are created and identified at the singular transaction level. In a non-limiting example, a carpool can exist for a single instance of a paired ride, as well as for other groups of riders and lengths of rides. The identification of the carpool is automatically known by the RideFlag® system. In this exemplary embodiment, the platform identifies the occupants, the route and time of access. The RideFlag® server may then issue a report of confirmation of occupancy to each of the relevant highway operators upon request, complementing any existing photo confirmation systems and providing either a primary or secondary occupancy validation for Toll and highway operators as users of the RideFlag® system. The occupancy and validation for vehicles within a toll system provides the Toll and highway operators the ability to incentivize the use of such Toll and highway system with rewards, which may take the form of free access, additional monetary incentives, premium and preferred parking, or any other incentive that may be created by Toll and highway operators to incentivize the use of such roadways.

In an embodiment, the driver's GPS coordinates and/or other physical location data are known to the application (app), since the driver may keep the app open on the smart device for the duration of a trip. Additional physical location data may take the form of communications from smart device to smart device (such as a smart phone, tablet, wearable armband, smart watch or any other mobile wireless device) through the use of one or more near field communication protocols, where such protocols may include, but are not limited to, Bluetooth, BLE, Zigby, or any other near field communication protocol.

A first server compares the GPS and/or other physical location data from all devices that are within a pre-set physical location of the smart device associated with the driver. The server may also receive sensor data information from infrared, audio, and vibration sensors, as well as request image data from one or more devices physically located within a vehicle. The server may aggregate all GPS, sensor, and image data to perform a comparison against the devices whose location indicates they are co-located within the vehicle and against the pre-established co-location criteria. In an embodiment, if the comparison provides evidence of the co-location of devices, the co-location is considered to be verified. Confirmation of such verified co-location can then be submitted to appropriate regulatory bodies for the certification and transmission to a user of a reward, such as permitted HOV or HOT access, or permitted preferred parking, or other rewards that may be provided by the transportation authority or additional entities partnering with the transportation authority.

In an alternative embodiment, the RideFlag® application may permit the use of free or discounted access to HOT lanes to vehicles in which there is only one verified person based upon special considerations. Such special considerations may include, but are not limited to, premium access based upon a specified number of paid uses of the HOT lane, special discounts for particular dates or times, a reward offered by the operator of the HOT lane, or any other special consideration defined by the authority operating the HOT lane. In a non-limiting example, a vehicle with a single driver may be permitted to use the HOT lane after accumulating 10 authorized uses of the HOT lane, meeting all conditions of such use. Additionally, an authority operating a HOT lane may permit use of the HOT lane to single driver vehicles, or vehicles that do not meet all of the conditions for use of a particular HOT lane, to users with a mobile device in the vehicle that has been certified as having a special premium established by the authority operating the HOT lane even though the user of the mobile device in the vehicle may not be the driver of the vehicle.

In an embodiment, an array of biometric techniques may be used to validate the number of occupants present in a vehicle. Non-limiting examples of biometric techniques may include facial count and verification where each participant registers their individual face (facial signature) via the camera and is added to the ride. A facial signature is a mathematical construct created from the features of an individual captured in an image. The facial signature may be used immediately in a biometric validation process, or may be stored and used at a later time as input to a biometric validation process. This technique may include a count of human faces "seen" in a prompted (relevant time/location stamped) photo validated by biometric human face determination, validation of a facial signature, and/or a count of human faces made by a system server based on system input other than an actual photograph. This collection of faces is assumed to be a continuous group as the vehicle passes through reward points. Whenever a rider leaves the carpool, which is accounted for in the Drop Rider process, a confirming photo is taken and the ride is marked as a carpool collection change where the total participants is decremented and the face is now removed from the collection.

In this embodiment, the RideFlag system ensures that the driver is not distracted by, for example, being asked to take a photo or give their phone to a passenger to take a photo while in the act of driving. The add/drop method as embodied in the verification and Drop Rider process steps provides a reliable history of the trip in which the system may confidently assume that the departing rider was with the carpool during the time up until any departure, given that the driver phone is used to manage the face collection, count, and verification. In this embodiment, the system may grant awards based on the collection of occupants. During the verification process, failure to take a confirming face signature when any occupant leaves the passenger compartment of the vehicle will consider that person as having never been in the carpool collection, affecting the rewards that may be awarded based upon occupancy verification. This non-limiting implementation is further discussed in a later section.

An additional biometric validation technique may utilize audio, where a count is made of distinct voices "heard" in response to audio prompts, the number and sources of such voices being validated by one or more biometric voice-distinction algorithms. In this non-limiting implementation the occupancy validation may consist of audio collected for each voice that is different in pitch, tonality, or other audio parameters to identify each voice as separate and distinct from each other voice. Additional biometric techniques may include iris scanning or requiring the capture of a short video image to determine if the images of the individuals are actually shifting or moving, further discussed later in this document, to validate that a natural person is occupying a position within the vehicle instead of an image of a human.

While use of biometric validation techniques herein described may be employed for many different reasons, multiple techniques of validation can be of singular help in the event that vehicle occupants do not carry smartphones or other suitable electronic devices. While this is often the case with young children, people of every age may elect not to continually carry smart devices, such as smart phones, at all times, and even those who do may elect to turn the smart devices off during transit.

In cases where RideFlag® determines that an extra level beyond smart device validation is required—such as when RideFlag® suspects one or more users may be mimicking an additional person by deploying multiple user profiles on additional devices without an actual human user present in the vehicle, biometric validation may be used to prevent users' "gaming" the system. Whenever biometric validation is deemed necessary, regardless of the reason, the instant innovation requires all occupants who intend to be counted in the occupancy count for verification to use the biometric method. Biometric techniques for occupancy verification provide avenues for multiple modes of occupancy verification without relying on any single technique.

In an embodiment, occupancy validation may be performed with a simple optical scan with dynamic occupancy count, a procedure typically performed at set geographical locations and/or certain times of the day, and/or upon lapse of a particular time interval in the users' trip. This method may require a front-seated passenger to take a "Selfie" shot (a photograph framed with at least the photographer in the resulting image) which shows the faces of all occupants of the vehicle, or separate shots showing each passenger in the vehicle and permitting a collection of distinct face signatures.

In an embodiment, occupancy validation may be performed via Facial Distinction such as, but not limited to, facial signature. Such an embodiment would employ a Biometrics Engine to compare a Base Pattern with a Candidate Pattern, where each pattern is a template of biometric traits used to determine an individual. Additionally, additional sensors, such as an infrared capture capability, may be used in conjunction with a facial signature to improve accuracy in validation of natural persons occupying the vehicle. While a typical biometric model would output the probability that the Base Pattern and Candidate Pattern are a match, the RideFlag® model employs a biometric engine to determine the probability that the Base Pattern and Candidate Pattern are NOT a match. In this embodiment, the verification process may calculate the probability of Match between carpool formation and/or inclusion of new members through the indication that a new facial signature has been added to the passenger compartment, and at the end of each user's journey. Utilizing a wide-angle lens camera permits the camera/IR sensor in a transponder to serve as the collector of facial signatures for all occupants in a passenger compartment, although this should not be considered limiting. Upon calculating a Probability of Distinction above an acceptable threshold, the RideFlag® server may determine that vehicle occupancy is sufficient to reward the vehicle occupants with lane access or any other reward that is offered by the Toll Highway or other road operator.

The RideFlag® server can dynamically perform the straightforward task of identifying the count of human faces among those participants who are facing towards the camera, with or without actually transmitting a captured photo. In an embodiment, the system actively counts faces within a single facial image or from a group of images. The system collects image data as the camera focuses, prior to taking a photograph, and compares a frame with a subsequent frame to determine if the human head, or heads, framed in the image are moving relative to one another over time. To provide alternative assurance that captured images are of faces of real individuals within the passenger compartment, the system may as a user to smile, frown, or blink to confirm that they are real and actively located within proximity to the driver. This technique provides an accurate assessment of individuals located within a passenger compartment without physically transmitting a captured photo. The system server can measure a variety of metrics associated with the motion of each human head, and the facial signature associated with each human head either separately or together, to distinguish one human head from another, as each head is framed by the camera lens. The collected movement data is analyzed to show that the image frames individuals actively seated within the passenger compartment of a vehicle and not just images of individuals held up by other passengers or later pasted into the image data. This technique can be employed to prevent users from "fooling the system" by displaying a photograph in lieu of a live human face.

In alternate embodiments, occupancy validation may be performed using biometric data accumulated through other identifying scans in addition to one or more images stored and used for pre/post carpool validation, including but not limited to iris scanning, ear scanning, or hand and/or fingerprint scanning. In an embodiment, individually assigned facial signatures may also be used to trigger other application functionality, such as, in a non-limiting example, signing in to the passenger compartment of a particular vehicle. Alternatively, or in combination with the foregoing methods, occupancy validation may be performed through Voice Distinction, as previously described, whereby the idiosyncrasies of an individual occupant's voice, as transmitted to and determined by the RideFlag® server, serve as that occupant's unique identifier.

In an embodiment, each of the foregoing models for occupancy validation may be delivered within the RideFlag® application (app) utilizing the camera and microphone and any other sensor incorporated within or associated with the user's smartphone or other smart device. Alternatively, each model may be delivered as embedded software within other apps (as a software development kit for validation, and prompted by geolocation for rewards offered through the RideFlag® Rewards platform). Each model may be built into highway transponders with automatic verification of occupants, such a system utilizing a camera equipped with a wide-angle lens and dedicated chip for reporting human face count and the fact that the human face count is for distinct human faces that make up the total face count, utilizing an Infra-Red camera to evaluate distinct human heat signature in the confines of the vehicle, or utilizing a combination of an optical camera and an Infra-Red camera, when each of these cameras is either outside or inside the vehicle or installed as elements of the vehicle.

In an embodiment, validation for rider occupancy may also be performed through the use of facial signatures captured within a smart device associated with a driver. In this embodiment, the capture and use of facial signatures may be performed in combination with all biometric verification techniques herein presented. The facial signatures may be captured and stored within a smart device through the use of the camera integral to the smart device. The verification of occupancy may be performed through the count of facial signatures that are established as being located within a preset distance of the driver during a journey, where the preset distance is the same as the physical area of a vehicle associated with the driver, indicating that the individual facial signatures are collocated with the driver within that vehicle. The verification of occupancy may also be performed through a simpler count of faces and/or heads where no stored facial signature may be required to perform this count and provide an occupancy verification based thereupon.

To initiate this process, the driver registers his facial signature on his smart device by utilizing the view finder of the camera integral to the phone. The view finder captures a mathematical description of the face of the driver, whether or not a photo is captured. This mathematical description is the facial signature for the driver that is stored in the smart device for later comparison and verification. The driver may then capture additional facial signatures for all other participants in a carpool or other individuals who may be located within the preset distance of a driver in a current journey or in future journeys. Once registered on a driver, or other user's, smart device, the registration process does not have to be repeated as the smart device may contain a "friends list" into which the facial signature is stored.

When a carpool action takes place utilizing the face count verification of occupancy, each participant in the carpool is accepted into that instance of a carpool by looking at the smart device associated with the driver or another user through a "check in" action. Looking at the smart device permits the smart device to capture the facial signature of the individual. The facial signature is then compared against the facial signatures in the "friends list" currently stored in the smart device. If the facial signature is recognized, the individual is added to that particular carpool journey. If the facial signature is not recognized, the driver or other user will be prompted to register the individual and place the newly captured facial signature into the "friends list" maintained on the smart device and add the individual to the instant carpool journey.

When a registered individual leaves the particular carpool journey prior to reaching the driver's final destination, the individual may be removed from the carpool journey at the point they leave the vehicle and are no longer within the preset physical distance from the smart device associated with the driver or other user through a "check out" action. As the individual members of the particular carpool journey leave the vehicle, either at the driver's destination or prior, the smart device maintains a record of the time and location of the departure of each facial signature, representing the individuals participating in the particular carpool journey, to create and manage the history of the carpool journey and the participants therein.

The driver, or other preselected user if the driver is not the manager of the particular carpool journey, may be responsible for all "check in" and "check out" actions for the duration of the carpool journey. The driver, or other user, may be motivated to comply with the "check in" and "check out" actions for the particular carpool journey because the rewards earned along the carpool journey will not be granted until the driver or other user has confirmed the occupancy of the vehicle by having each participant both "check in" and "check out" of the carpool journey. In this embodiment, all rewards will be held in suspension until occupancy is confirmed at the end of the carpool journey, regardless of when each individual "taps out" of the vehicle.

In a non-limiting example, the process of building the occupancy of the vehicle does not require that every participant in the carpool journey be present in the view frame at the same time. In this example, each face can be viewed and confirmed individually at the start of the trip, by "tapping in" while the vehicle is stopped. In a further non-limiting example, a Mom may scan the faces of each of her children prior to beginning the carpool journey and then scan the faces of her children when the vehicle has reached the journey termination point. This process may be used in combination with other occupancy verification methods to provide a secondary check of the vehicle occupancy.

When an optical solution is used in combination with an Infra-Red solution, such a model would include a low-resolution optical camera, an infrared scanner, and a chip with known human face shape recognition for counting faces, as well as an Infra-Red interpreter for estimating human body heat signatures. When two metrics are combined (heat signature and optic face count), a more accurate probabilistic count of human occupants may be determined. In implementing such a solution, the optic and heat signature measurements remain anonymous and non-disseminated. No imagery is necessarily captured, stored or transmitted beyond the parameters of its immediate use.

The RideFlag® system offers a robust, data/rules based reward system based on a set of parameters defined within the system. The reward system parameters may include defined occupancy, distance, locations, and/or other requirements that trigger one or more rewards or incentives once the defined system parameter has been met. In an exemplary embodiment, the system may provide an incentive for preset vehicle occupancy thresholds, where the system may provide an incentive upon verifying the presence of 1, 2, 3 or more occupants in the vehicle. Another incentive may be triggered based upon the proximity of the carpool location to a defined reward point. The system may trigger an incentive based upon the proximity to the driver at the end of a trip. In a non-limiting example, the distance proximity to a driver is useful for college or university campuses where a rider may get dropped at a campus location and the driver proceeds on to another physical location to park the vehicle. The system may also trigger an incentive based upon a total carpool distance travelled as a minimum threshold. In a non-limiting example, a total carpool distance threshold of 50 miles may be set to trigger an incentive.

Additional incentives or rewards may require membership in an organization known as RideFlag circles. The organization membership is required of some or all participants to receive some rewards that have been established for members. The system may also have a set number as a maximum number of rewards to grant. The maximum number of rewards may be associated with a time span, such as weekly or monthly, to individuals, or set as an overall maximum. Rewards may be offered to a driver or to riders within the same vehicle, or to all participants within a registered vehicle. External requirements such as the vehicle also being registered with a parking or highway facility, such as, in a non-limiting example, a registered permit holder or transponder account holder. In partnership with one or more external groups, such as, in a non-limiting example, a university, parking authority, highway authority, or other partner, may validate any external requirements at the time the RideFlag system makes an API call to the partner system with the required information. The parameters identified and configured within the system server give reward grantors a complete set of variables to provide compelling incentives while controlling any reward offering exposure and limiting "cheating", where "cheating" may be defined as a driver or rider attempting to ask for or demand a reward or incentive where the conditions for receiving a reward or incentive have not been met.

The RideFlag system dynamically evaluates and verifies the number of occupants in a vehicle at the time of the reward request through an App on a mobile phone or other mobile device at various trigger points during the travel of each vehicle registered with the RideFlag system. In an exemplary embodiment, the verification is usually triggered by the vehicle passing into or through a geo-fenced area. When a reward event is triggered, the RideFlag system server verifies the number of occupants in or near the vehicle and ensures that the rules set by the parameters are all met in order to grant the reward.

The RideFlag® validation system accounts for all RideFlag® participants involved in the carpool/vanpool. The system has the ability to validate the location of every participant at the time of each reward granting opportunity and as such the system can offer a very robust incentive structure.

In an embodiment, the RideFlag® system may enable billing rate incentives for customers based upon the customers' ability to pay for entry onto certain roads or into certain parking areas. By way of non-limiting example, drivers identified as grossing less than a certain set annual revenue may receive preferential pricing when entering roads in heavily trafficked geographical areas that may have instituted tolls or other payments for use of the roads in the geographical area, such as, in a non-limiting example, Manhattan. Such drivers may avail themselves of certain municipal tax incentives if through use of the RideFlag® system these same drivers can show compliance with tax program criteria. In order to qualify as a potential recipient of means-based incentives, a driver would be required to provide the appropriate proofs when initiating or updating his or her RideFlag® system device. However, once again this example should in no way be considered limiting as any billing structure or billing rate incentives may be enacted by created business rules associated with billing on the system server and analyzing travel for validated users on enrolled roadways for compliance with the pre-established billing structure and/or billing rate incentives.

Alternate embodiments for such billing rate structures may be employed by individuals who qualify for special vehicle access. Non-limiting examples include toll reduction because of special status, and parking privileges provided because of special conditions such as parking fees having been prepaid, the driver's or passenger's having a handicap, or the driver's or passenger's being an expectant mother. Such privileges may be provided dynamically as awards to validated users of the RideFlag system.

In an embodiment, as communications technology is fully integrated into passenger vehicles and the divide between car and device becomes less apparent, the vehicle itself may be used as a device for interacting with the RideFlag® system. When seeking rewards for parking a vehicle, a user may use the RideFlag® system to determine the number of people in the vehicle using, among other methods, determination of the number of live human heads present in the vehicle. A secure determination of a live, natural person may be made through optic or infra-red detection, or micro-duration movement detection, in which the motion sensing device determines the presence or non-presence of small movement during a certain short time period, such as, by way of non-limiting example, one second. Because no living human's body stillness is ever absolute, even over short time intervals, detection of the presence of small movement can be a factor in determining the presence of a live human being in a vehicle.

In an embodiment, the instant innovation may use human face recognition software to count human heads (with expression change and/or heat signatures to ensure "Live and Real faces"), present in vehicles for the purpose of reporting confirmed vehicle occupancy count. Expression changes can be managed as factors in determining the presence of faces of living individuals. In a non-limiting example, the determination of the presence of the faces of living, real individuals may be referred to as "RealFace" determination.

In an embodiment, the mobile device that interfaces with the RideFlag® system may be wholly integral within itself but may be attached to or imbedded in the vehicle seeking rewards. As a non-limiting example, the device may take the form of a mounted transponder or "puck." In-vehicle cameras with a wide-angle lens have the camera positioned to capture most of the cabin. In-car OEM cameras mounted in or on a car's console can be used for evaluating and confirming "RealFace" using streaming-video and artificial intelligence analysis of facial expression change.

In an embodiment where a camera is to be embedded in an aftermarket device such as windshield-mounted transponder or other device, the instant innovation can use BLE on the transponder to communicate a series of still images to a phone in the car that is running RideFlag® technology. RealFace confirmation may be obtained with an InfraRed overlay. In a non-limiting example, a transponder would be embedded with both an inexpensive low-resolution camera with a wide-angle lens, and a low cost InfraRed scanner for overlaying the resulting imagery.

In an embodiment in which a reference image for a particular live and real human face (and/or facial signature) is known, RideFlag® may check a face currently within view of one or more cameras against the reference face. In a non-limiting example, this technique may be used to confirm that a registered user is contemporaneously co-located with the phone holding that user's profile. This technique of confirming the user's presence with the phone can serve as a means of verifying that the report from the phone accurately reflects the location, velocity and co-location of other individuals purporting to be in proximity to the user. This feature can serve as an important deterrent to users' cheating incentive programs. Since users cannot simply have multiple phones with different profiles, this technique confirms the user is actually with his phone.

Further the technique herein presented also confirms that the face is indeed a real human face by detecting emotion changes by the same face while staying constantly in the camera frame. In an embodiment, the instant innovation performs a confirmation audit optionally at the start of a carpool, at the end of a trip, or both. Recognition of the presence of the same, real faces at the end of a shared carpool trip based on the face image captured at the beginning of the trip allows for heightened confidence in the trustworthiness of individual users.

Turning now to FIG. 1, a system diagram for an exemplary system operation consistent with certain embodiments of the present invention is shown. During matchmaking 100, driver's device 102 and rider's device 104 are paired based upon data provided by the users of the devices, such as destination, desired times of departure and arrival, and fee amounts. Once paired 105, driver's device 102 and rider's device 104 enter commence travel phase 106. Commence Travel phase 106 includes driver and rider meeting in physical space and beginning travel to a mutually-agreed upon destination. Upon reaching discrete validation points 108, driver's device 102 and rider's device 104 are triggered by a first server 109 to provide first server 109 with GPS coordinates and/or physical location based upon Nearby location as presented through near field communication between smart devices to determine whether devices are co-located. If the devices associated with the driver and one or more riders are determined to be co-located at 108 and if first server 109 determines that reward requirements are met, first server 109 confirms reward status with second server (owned or controlled by the reward grantor, such as a regulatory agency, transportation authority, or a partner to these entities) and with at least driver's device 102. Upon confirmation of the reward status, rewards may be transmitted to a driver 110.

Figure 2:
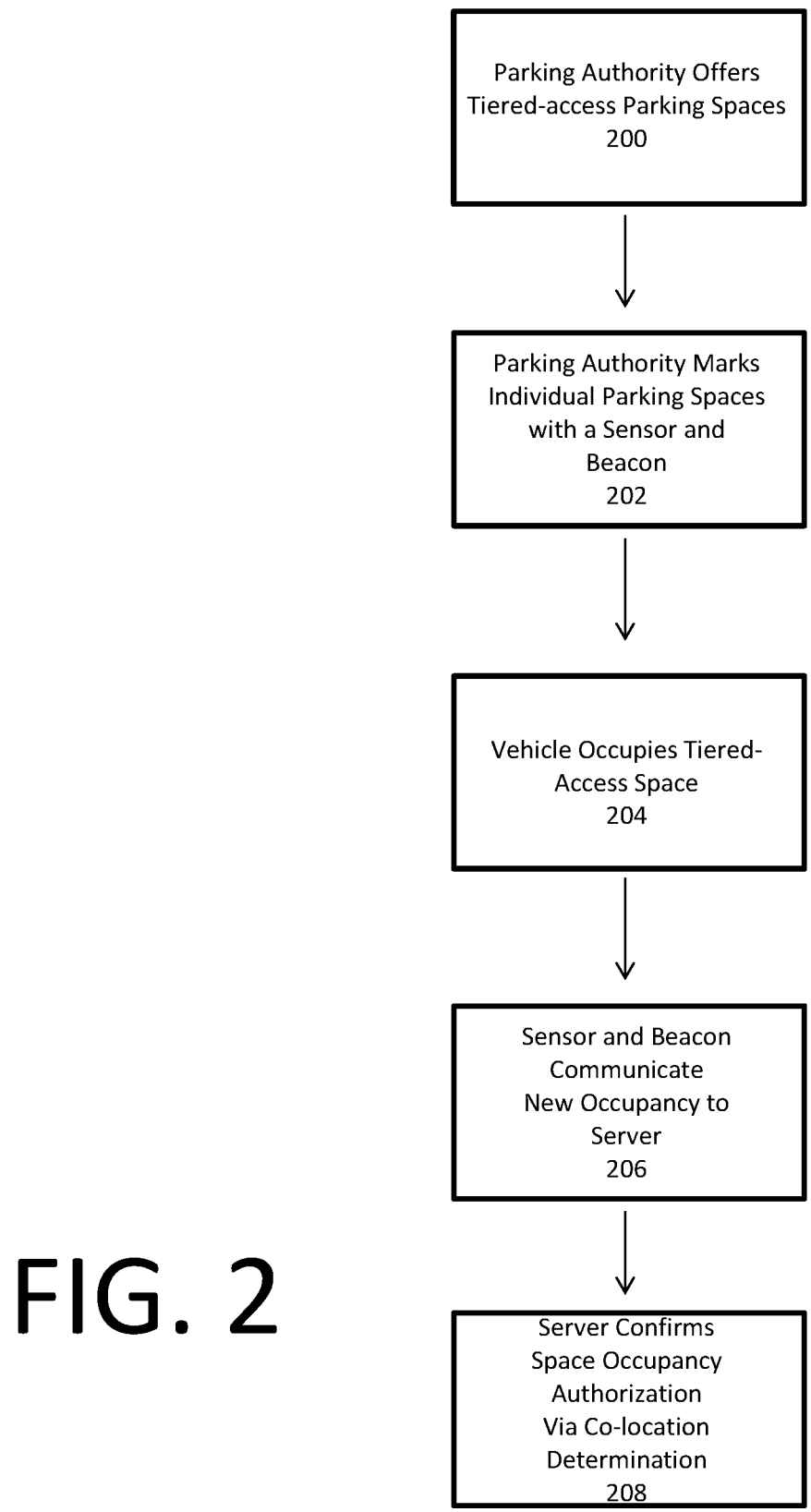
FIG. 2 is a process flow diagram for the determination of sufficiency of award criteria using mobile device GPS data and communication of same by server operation consistent with certain embodiments of the present invention.

Turning now to FIG. 2, a process flow for the determination of award criteria consistent with certain embodiments of the present invention is shown. In an embodiment, a rider verifies his GPS coordinates and/or physical location based upon Nearby location as presented through near field communication between smart devices to determine whether devices are co-located at a validation point 112. At 114, the system server compares the physical location confirmation information sent from a driver to that driver's known physical location as determined by the RideFlag® system. From this information, the server may determine if the driver and rider(s) are currently co-located. At 116, the server determines if the necessary reward criteria have been met. Most commonly, reward criteria would involve the number of occupants in a car associated with a time of day. The number of occupants in a car may be determined by the number of RF signals detected at a validation point, or by photo evidence provided by any one of the detected mobile devices associated with an RF signal that is collocated with the driver's mobile device. At 118, the server sends determination regarding satisfaction of reward criteria to the appropriate regulatory authority, transportation authority or partner, the rider(s), and the driver.

Figure 3:
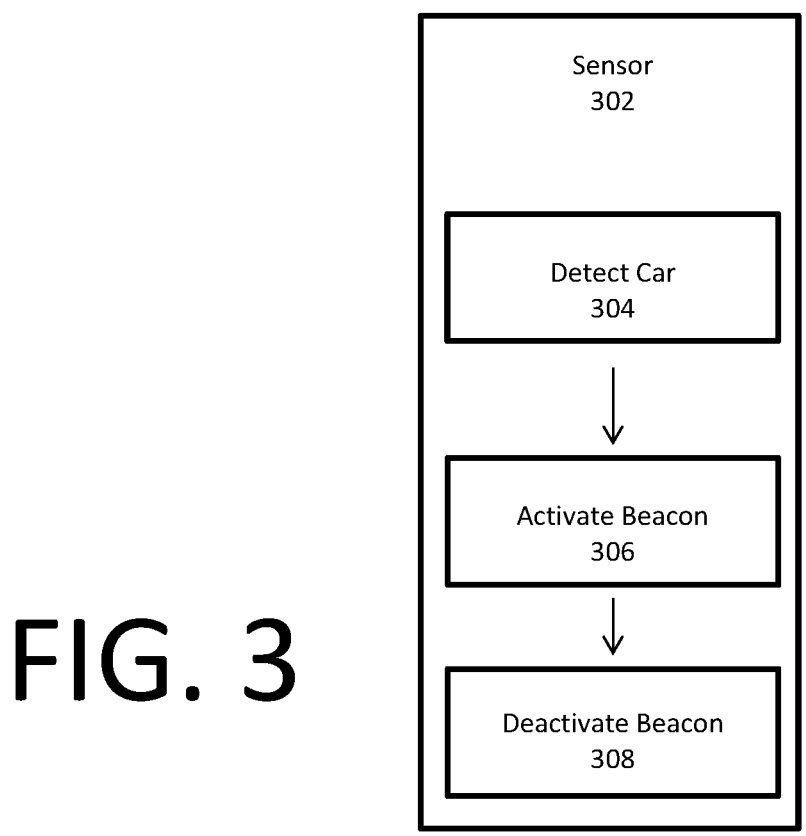
FIG. 3 is a process flow diagram for verification of vehicle occupancy consistent with certain embodiments of the present invention.

Turning now to FIG. 3, a process flow diagram for verification of vehicle occupancy is shown. In an embodiment, at 130, the ride commences, with the driver and rider beginning the trip to any reward point or rider destination. At 132, the driver's device comes within detection distance of a validation point which may then trigger a server request for verification of the number of car occupants. In an embodiment, at 134 the lead smart device, such as, in a non-limiting example, the smart device associated with the driver of the vehicle, reports the number of smart devices registered to be within the passenger compartment of the vehicle and still confirmed to be physically co-located within the passenger compartment with the lead smart device. The system server may then utilize the report from the lead smart device as a confirmation of occupancy in the vehicle for all registered passengers and pushes the request for an award to the rewarding server at 136. In a non-limiting example, such a validation point would typically be positioned immediately prior to HOV or HOT lane access. In the case where the reward is a preferred parking spot instead of special lane access, the validation point may be positioned at a parking lot entrance or parking garage entrance.

In an embodiment, at 138, in cases where the number of RF transmitter-equipped devices (i.e.: smart devices such as smartphones, or other RF transmitting devices) does not equal the number of individuals collocated in a vehicle, which includes the driver and all riders, the server sends a request to the lead smart device for additional verification of occupancy in the passenger compartment of the vehicle. In a non-limiting implementation, the additional verification may take the form of capturing facial signatures for all occupants by the lead smart device capturing a photograph of all occupants. A facial signature is calculated for all occupants in the photograph and compared against all facial signatures for occupants registered for the trip. At 140, if the comparison indicates a confirmation of all individuals registered for the trip are occupants of the passenger compartment of the vehicle, the RideFlag® server may then hold the push for reward determination until the destination for the vehicle has been reached.

If, however, the number of occupants is not verified by the comparison as having the proper number and identified facial signatures, at 142 the system may determine that the reward may require modification or that no reward should be granted.

Once again, at 136, if the number of smart devices reported is equal to the number of occupants registered for the trip, and all respondents are determined to be within a set distance that indicates they are close enough to the driver that they are within the passenger compartment of the driver's vehicle, the RideFlag® system may still at 144 request a face count for all occupants of the vehicle to comply with any external requirements for award eligibility and grant. If a facial count is not required or requested of the lead smart device from the RideFlag® server, the RideFlag® server may still perform a test at 150, on an as-needed or random basis, to determine if "cheating" is occurring. "Cheating" for the RideFlag® system is defined as rewards that are obtained contrary to proximity requirements or are obtained through false reporting of occupancy of a vehicle in combination with additional smart devices that may be located within the passenger compartment of the vehicle, but are not associated with separate individuals. If a determine is made that cheating is not occurring, at 152 the RideFlag® server may transmit any and all rewards and incentives that are due to the lead smart device for the given trip and occupancy level.

In an embodiment, at 144, in cases where the RideFlag® server has requested a facial count, the lead smart device may be instructed to send a photo of vehicle occupants time-stamped with the time of the driver's device that triggered the verification request at the encountered validation point. Uploading the time-stamped photo to the server permits the photo verification of the number of occupants in a vehicle utilizing the face count methodology. If the lead smart device reports occupancy via the Face count method, the RideFlag® server will flag any rewards and/or incentives as "pending" until the particular trip completes and all individuals as specified by facial signature for each individual face were accounted for at each point at which an individual departed from the trip and from the occupancy of the vehicle at 148. Failure to indicate a departure by decrementing the count of facial signatures within the passenger compartment of the vehicle upon the exit of any individual will provide the assumption in the RideFlag® server processing that the counted individual was not in the passenger compartment of the vehicle for that particular trip. If any individual has been determined to not be within the passenger compartment of the vehicle for any particular trip, any rewards that could have potentially been earned by the lead smart device or other smart devices in the vehicle will be re-evaluated by the RideFlag® server based upon confirmed occupants at the point of the reward.

As an additional verification, if at the termination point of any trip the RideFlag® server or reward grantor at 150 determines or suspects that the driver and/or riders may have falsified the proximity requirements the server may label this action as "cheating" the system. In a non-limiting example, one condition the server may label as "cheating" may be using multiple phones not associated to physical individuals to attempt to establish that there are an equal number of RF-transmitting devices and individuals collocated within a single vehicle. If the server determines that an action or activity that may be labeled as "Cheating" has occurred, the server may require the performance of a photographic check consisting of facial signature verification and/or facial count verification, which serves as a dual validation of the occupancy of the passenger compartment of a vehicle and check on any suspected cheating activity through post-event reply requests from the RideFlag® server to one or more smart devices co-located within a passenger compartment of a vehicle.

At 152, if the reward grantor is satisfied that that the occupancy of the vehicle has been properly verified, and that the driver is not "cheating" in some fashion, the reward grantor may then transmit the reward certificate, notification, validation, or permission to the driver of the vehicle.

Figure 4:
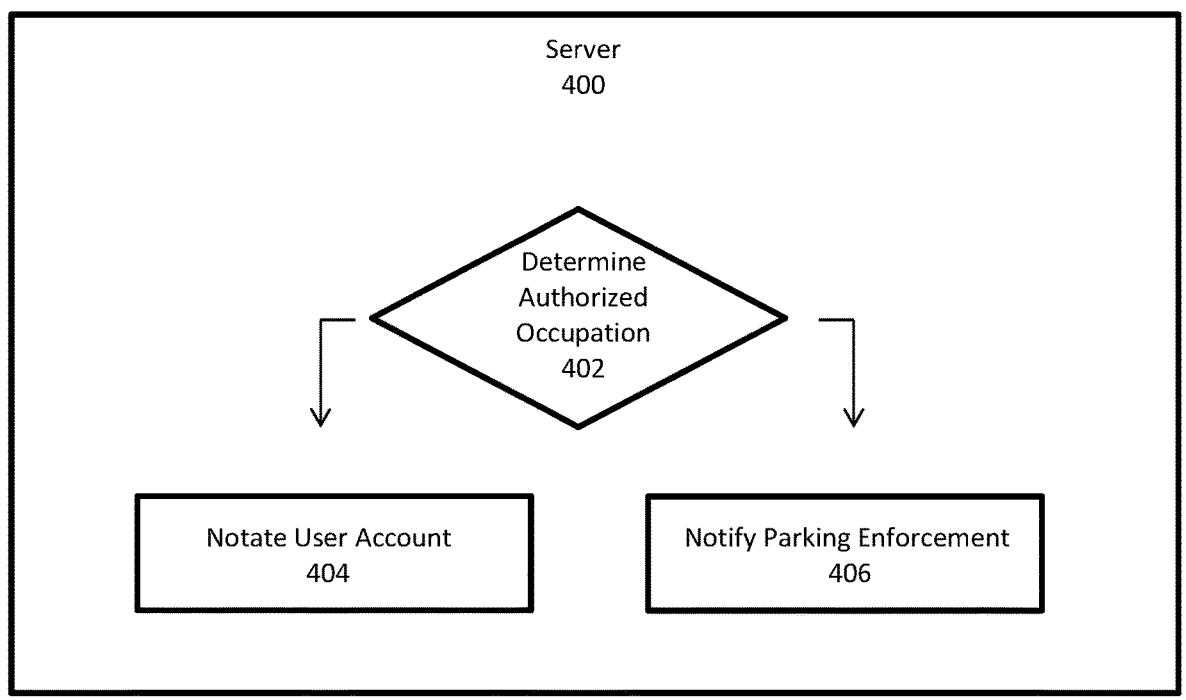
FIG. 4 is a process flow diagram for the determination of sufficiency of award criteria using one or more mobile

Turning now to FIG. 4, a process flow for an alternate determination of award criteria consistent with certain embodiments of the present invention is shown. In an embodiment, a smart device having a processor and an RF transmitter and associated with a driver communicates its physical location to an application server at 400. At 402, a driver of a vehicle records a verification photo of all vehicle occupants that are included in the occupancy of a vehicle passenger compartment for a particular trip. The verification photos are utilized by the RideFlag® server to create a facial signature for each occupant. Photograph capture and facial signature creation may occur at times different from the start of any particular occupancy or carpool trip, with the RideFlag® server active to associate facial signatures with occupants that have been previously captured by the smart device associated with the driver. Thus, at the beginning of a trip individuals may be included in the occupancy of the passenger compartment based upon facial signatures previously captured or newly captured by the smart device associated with the driver prior to any occupancy or trip. Additionally, the RideFlag® server may compare facial signatures for individuals regardless of facial orientation or expression to verify individuals who are involved with a particular trip or occupancy.

At 404, the RideFlag® server determines the number of occupants that are present in the vehicle based upon the count of the number of facial signatures that are in the captured photograph. At 406, if there are individuals for which the RideFlag® server does not have a facial signature either previously captured or newly captured the RideFlag® server may request additional photographs to complete the facial signature head count for any individuals that are in the occupancy of a particular trip but for whom the RideFlag® server does not have a facial signature stored in the verification database managed by the RideFlag® server.

At 408, smart device associated with the driver confirms the current occupancy status for each individual that is included in the occupancy of the passenger compartment. The driver's smart device performs a decrement of the occupants of the passenger compartment utilizing a Face Count procedure each time an occupant leaves the vehicle through a "check out" for each occupant that leaves the vehicle during the trip. The RideFlag® server holds any trip reward determination in abeyance until all occupants have been determined to have "tapped out" of the passenger compartment of the vehicle at the termination of the trip.

At 410, the RideFlag® server determines if the number of occupants meets one or more reward criteria. Additionally, the RideFlag® server is active to determine if external award criteria are required for a particular trip and if those external award criteria may include, such as, in non-limiting examples, whether the vehicle is properly registered, if the driver is part of a privileged group, if reward granting organizations are providing one or more limited time additional awards, or any other special criteria that may affect the award to be earned and captured. At 412, the RideFlag® server may send a determination regarding satisfaction of reward criteria to the appropriate regulatory authority, transportation authority or other authorized entity, the rider, and the driver, with the caveat that the award may be "whitelisted", or held in abeyance, until confirmation has be completed. Confirmation of award is sent to both any award sponsor authority and to the smart device associated with a driver a the end of any qualifying trip in which all occupants for the journey have been accounted for utilizing the Face Count process. The regulatory authority, transportation authority, or other authorized entity may then issue a certificate or any other verification acknowledgement instituted for use by the issuing authority that the reward will be provided to a person associated with the vehicle, where the person associated with the vehicle may include a driver, a rider, or other authorized person such as, in a non-limited example, the owner of the vehicle.

Figure 5:
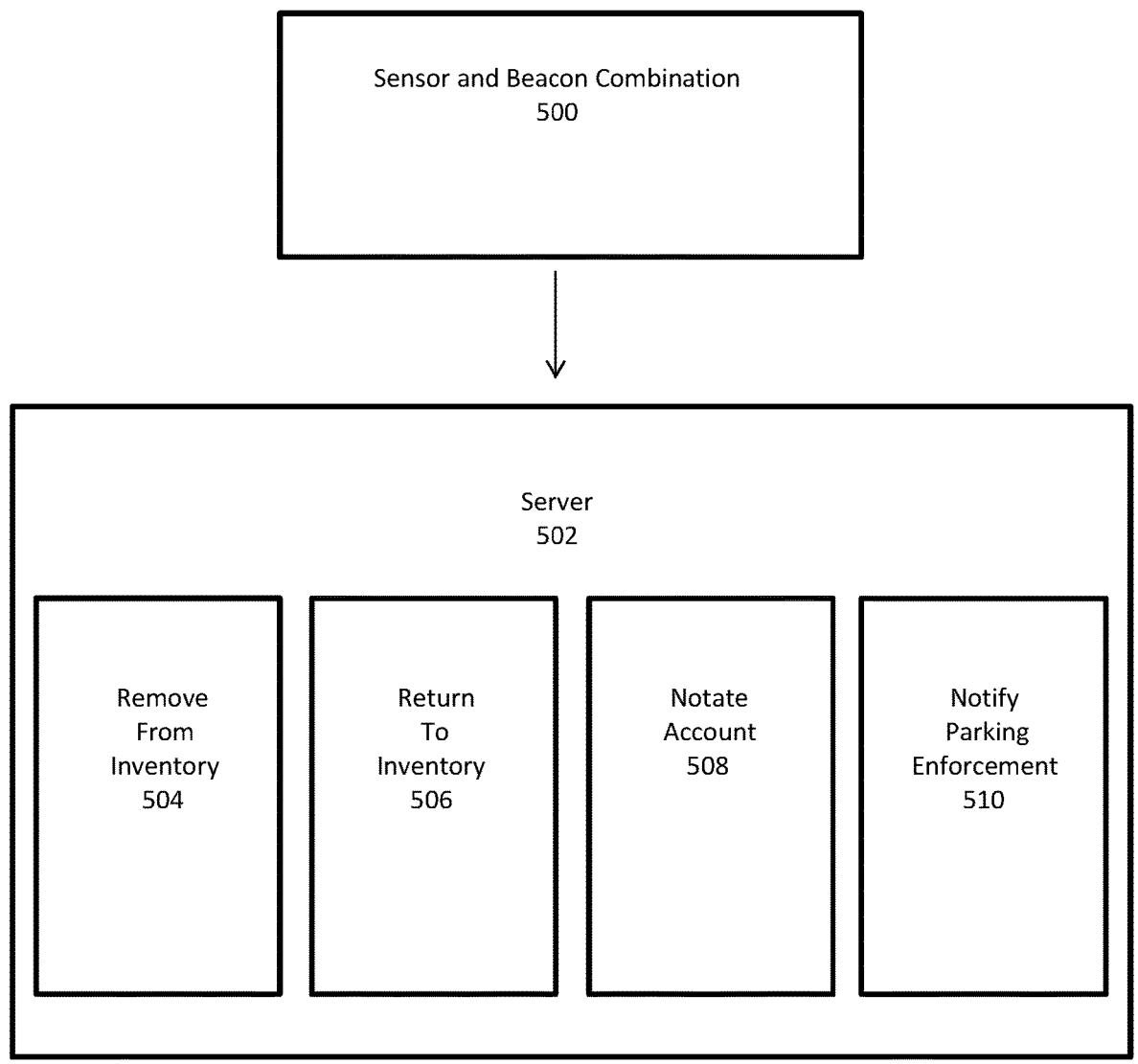
FIG. 5 is a process flow diagram for returning a Probability of Distinction consistent with certain embodiments of the present invention.

Turning now to FIG. 5, a process flow diagram for accounting for occupants of a vehicle who do not have a smart device associated with the occupant during a qualifying journey consistent with certain embodiments of the present invention is shown. At 500, the process begins. At 502, a Determination is made as to whether occupants of a passenger compartment of a vehicle in which a smart device is associated with a driver, but one or more occupants do not have an associated smart device. In a non-limiting example, at 502 the Determination is made based upon the query: are there any riders present in the vehicle who do not possess smart phones or smart devices. If "no," then the process ends at 510. If "yes," then at 504 the system collects for each individual that does not have a smart device associated with the individual, data suitable for biometric analysis, including but not limited to audio, optical, and Infra-Red (IR) data. At 506 the data is processed for biometric markers, such biometric markers capable of forming a discernable pattern. In an embodiment, unique signatures formed from the processed biometric markers may be stored on the lead smart device for each individual in the group. As a validation capability the RideFlag® server determines and returns the Probability of Distinction, a number or series of numbers representing the likelihood that a pattern resulting from biometric signature data collected from one individual candidate, like a passenger, does not match that of a base pattern from a known individual, such as a driver. This Probability of Distinction presents a separable identification for each member of the group that is participating in a particular trip. At 508, the lead smart device may confirm that each member of the group participating in the trip is still within the group just prior to each member's pre-determined endpoint utilizing the unique signature, composed of the previously described biometric markers, previously determined for each individual member of the group. At 510 the process ends.

Figure 6:
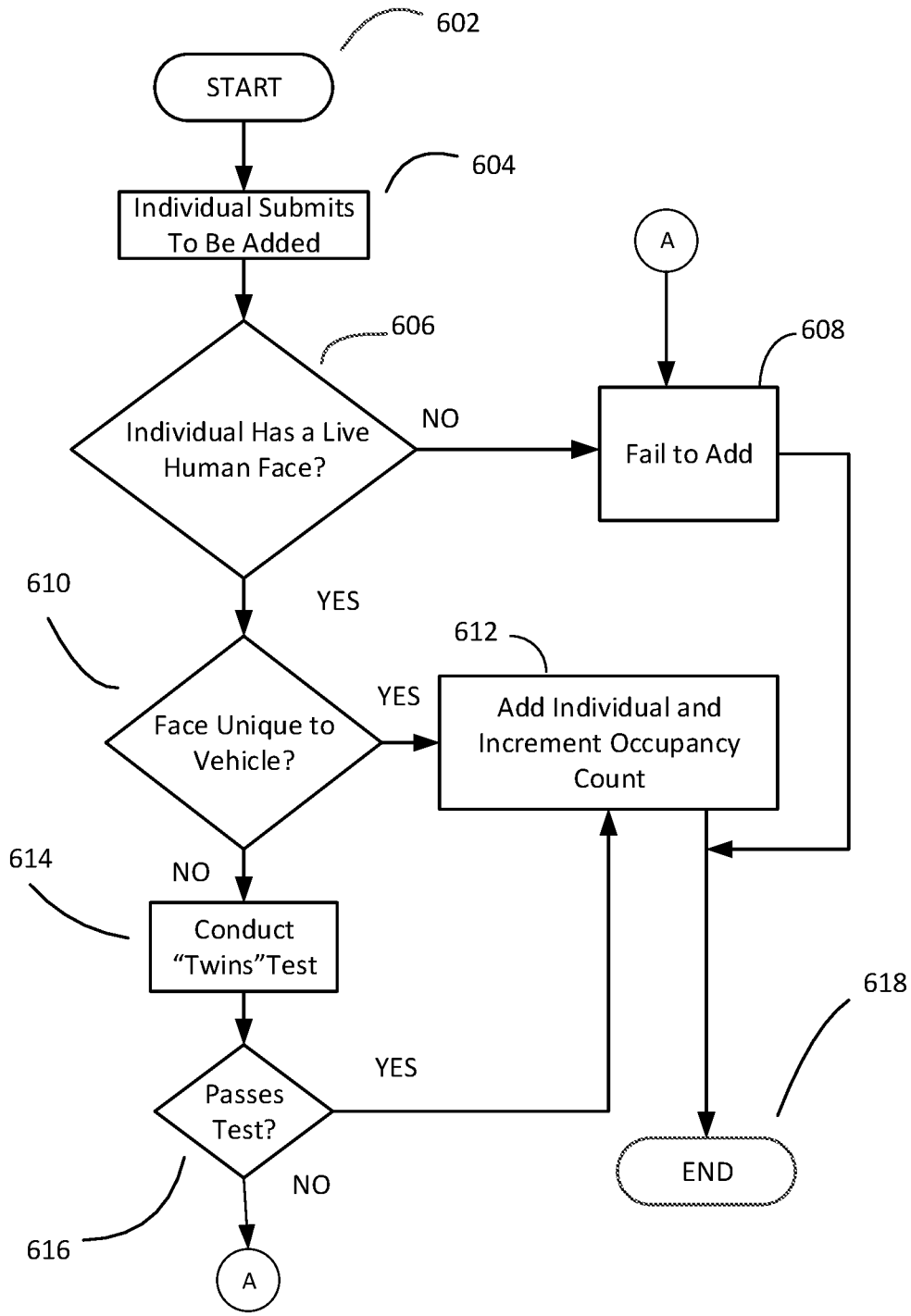
FIG. 6 is a process flow diagram showing a sub-process for verifying the existence of unique human passengers in a vehicle consistent with certain embodiments of the present invention.

Turning now to FIG. 6, a process flow diagram showing a sub-process for verifying the existence of unique human passengers in a vehicle consistent with certain embodiments of the present invention is shown. At 602, the sub-process starts. At 604, an individual submits a request to the system to be added as an authorized rider in a vehicle. The request prompts the system to use biometrics to validate the total count of occupants in a vehicle and validate that registered and authorized individuals are in the vehicle. At 606 the system determines whether the individual submitting a request has a live human face. In a non-limiting example of an individual without a live human face, a person seeking rewards or permissions reserved for high-occupancy vehicles may place a mannequin in the vehicle and attempt to claim the mannequin as a live human. At 606 the system uses a variety of techniques, such as motion detection and infra-red detection, to determine whether the individual is authenticated. If at 606 the answer is "no," then at 608 the individual fails to be added to the authorized vehicle count. If at 606 the answer is "yes," then at 610 the system determines whether the live human face is unique to the vehicle, or whether it appears in multiplicity, as in the case of identical siblings. If at 610 the face is unique to the vehicle, at 612 the system adds the individual to the number of authorized individuals in the vehicle, thereby incrementing the vehicle occupancy count. At 618 the sub-process ends. If at 610 the face is determined not to be unique to the vehicle, at 614 the system conducts a "Twins" test to determine whether the non-unique live human faces represent individual humans with very similar or identical facial appearance. If at 616 the system determines that the live human faces do not represent unique individuals (one or more individuals having failed the Twins test), then the individual fails to be added to the authorized vehicle count at 608. If at 616 the system determines that the Twins test has been passed, then at 612 the system adds the individual to the occupancy count.

Figure 7:
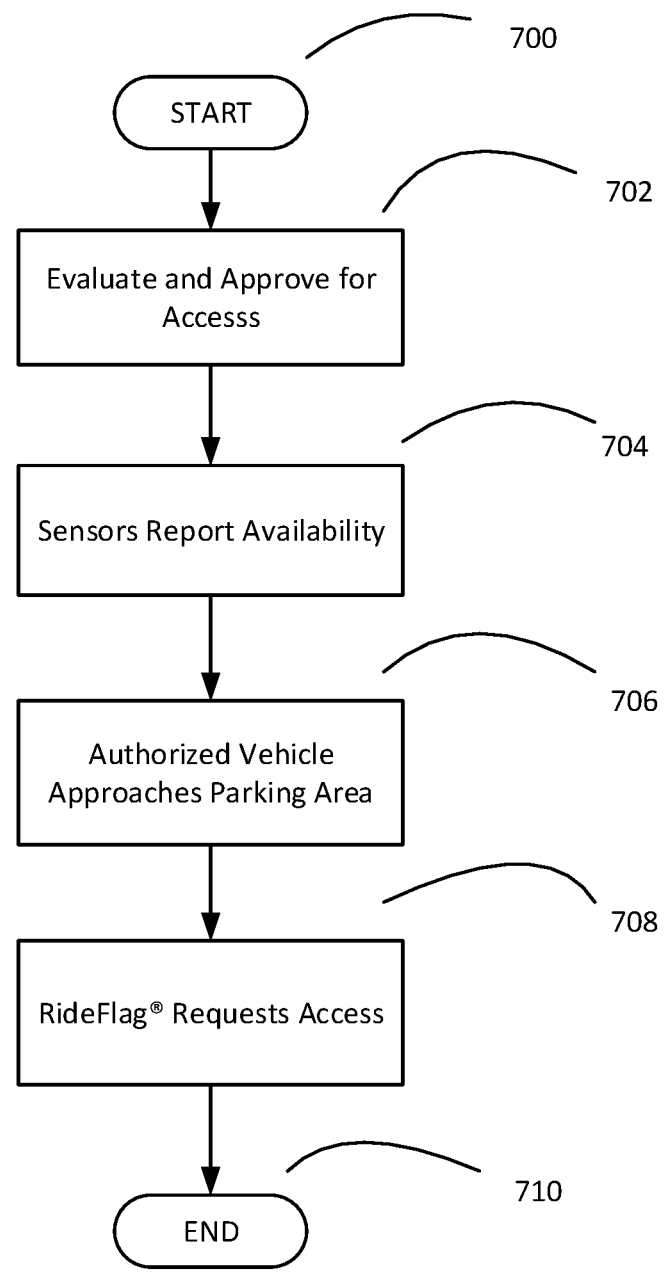
FIG. 7 is a process flow diagram showing a sub-process for determining vehicle authorization and access consistent with certain embodiments of the present invention.

Turning now to FIG. 7, a process flow diagram showing a sub-process for determining vehicle authorization and access consistent with certain embodiments of the present invention is shown. At 700, the sub-process starts. At 702, the system evaluates and pre-approves a vehicle for access to rewards, such as, by way of non-limiting example, parking privileges. Approval may in an embodiment be based upon total vehicle occupancy or the presence of a privileged registered individual in the vehicle. At 704, one or more sensors report availability of a parking space or similar subject of one or more rewards. In an embodiment, these sensors may be in or on the vehicle seeking rewards. In an embodiment, the sensors may be located in or on the vehicle and in or on the available parking space or similar reward subject. In an embodiment, the sensor may be located on or in the parking space or similar reward subject only. In an embodiment any combination of the forgoing embodiments may be used. Any of these embodiments may utilize BLE technology with or without one or more sensors. At 706, a system-authorized vehicle approaches the general area of the reward, such as a parking space. At 708 the RideFlag® system requests access to the reward from the reward provider, such as the administrator of a parking facility. At 710 the sub-process ends.

Figure 8:
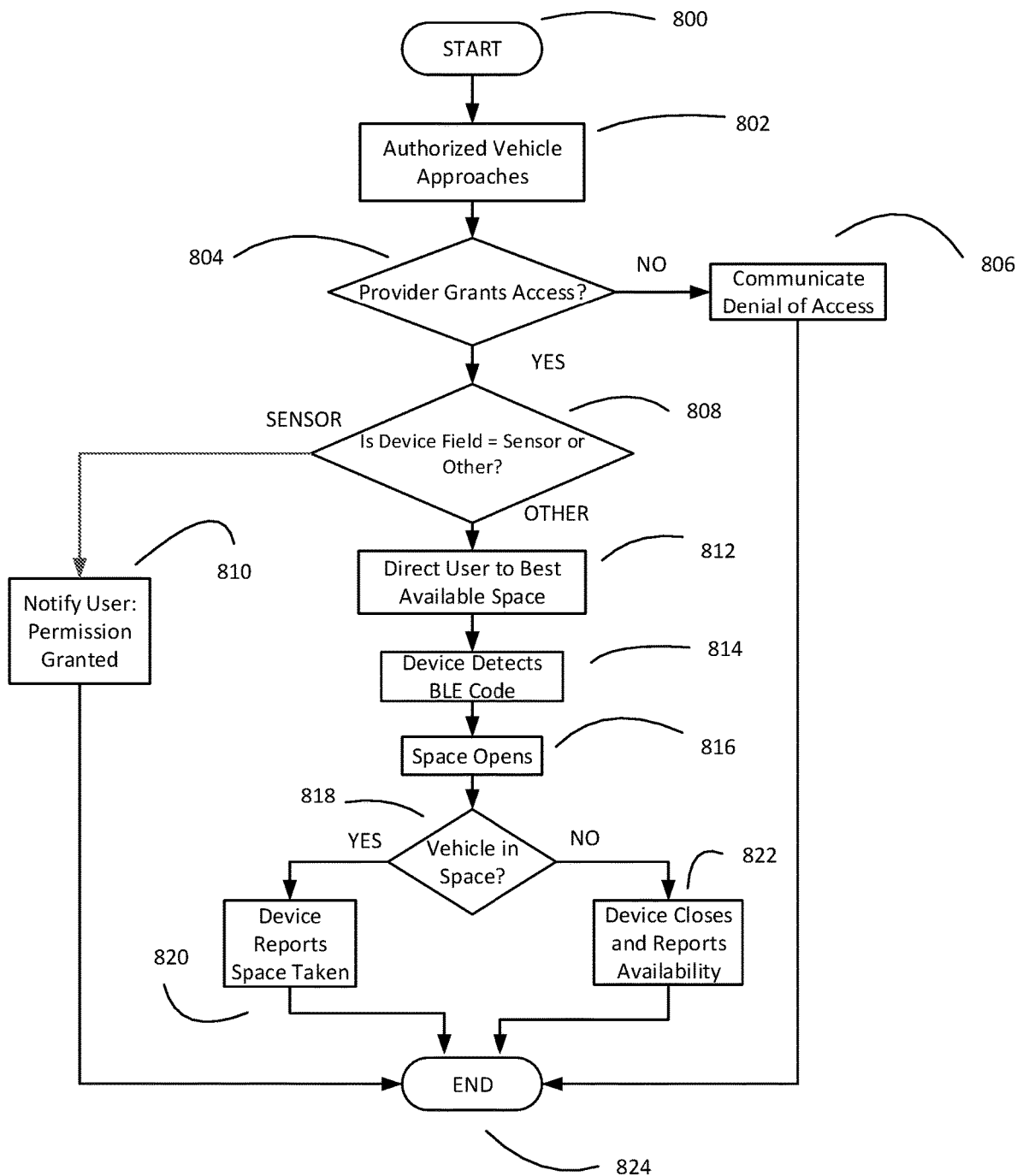
FIG. 8 is a process flow diagram of the vehicle reward access procedure consistent with certain embodiments of the present invention.

Turning now to FIG. 8, a process flow diagram of the vehicle reward access procedure consistent with certain embodiments of the present invention is shown. At 800, the sub-process starts. An authorized vehicle approaches a reward location. By way of non-limiting illustration, the reward will herein be referred to as a privileged parking space. At 804, the system determines whether the provider of privileged parking spaces grants access to the authorized vehicle. If the provider does not grant access, then at 806 the system communicates a denial of access message to the user. By way of non-limiting example, the user may be the driver of the vehicle, and the user receives such a message on the user's mobile device. If at 804 the provider does grant access, then at 808 the system determines whether the algorithmic Design Field reads as "sensor" or "Other." If the Device Field equals Sensor, at 810 the system notifies the user that permission is granted. The sub-process then ends at 824. If at 808 Device Field=Other, then at 812 the system directs the user to the best available space at 812. In an embodiment, the best available space may be outfitted with a physical locking device. The system directs the user to pause in front of the best available space. At 814 the physical locking device detects user's BLE code signifying user authorization. At 816 the physical locking device makes the space open for the user. The space will remain open for a certain pre-determined length of time, such as, by way of non-limiting example, sixty seconds. At 818 the system detects whether a vehicle has occupied the open space. If at 818 the system detects that no vehicle has occupied the open space, the locking device closes and the system reports availability of the space at 822. If instead at 818 the system determines that a vehicle has occupied the open space, at 820 the device reports that the space is taken.

Figure 9:
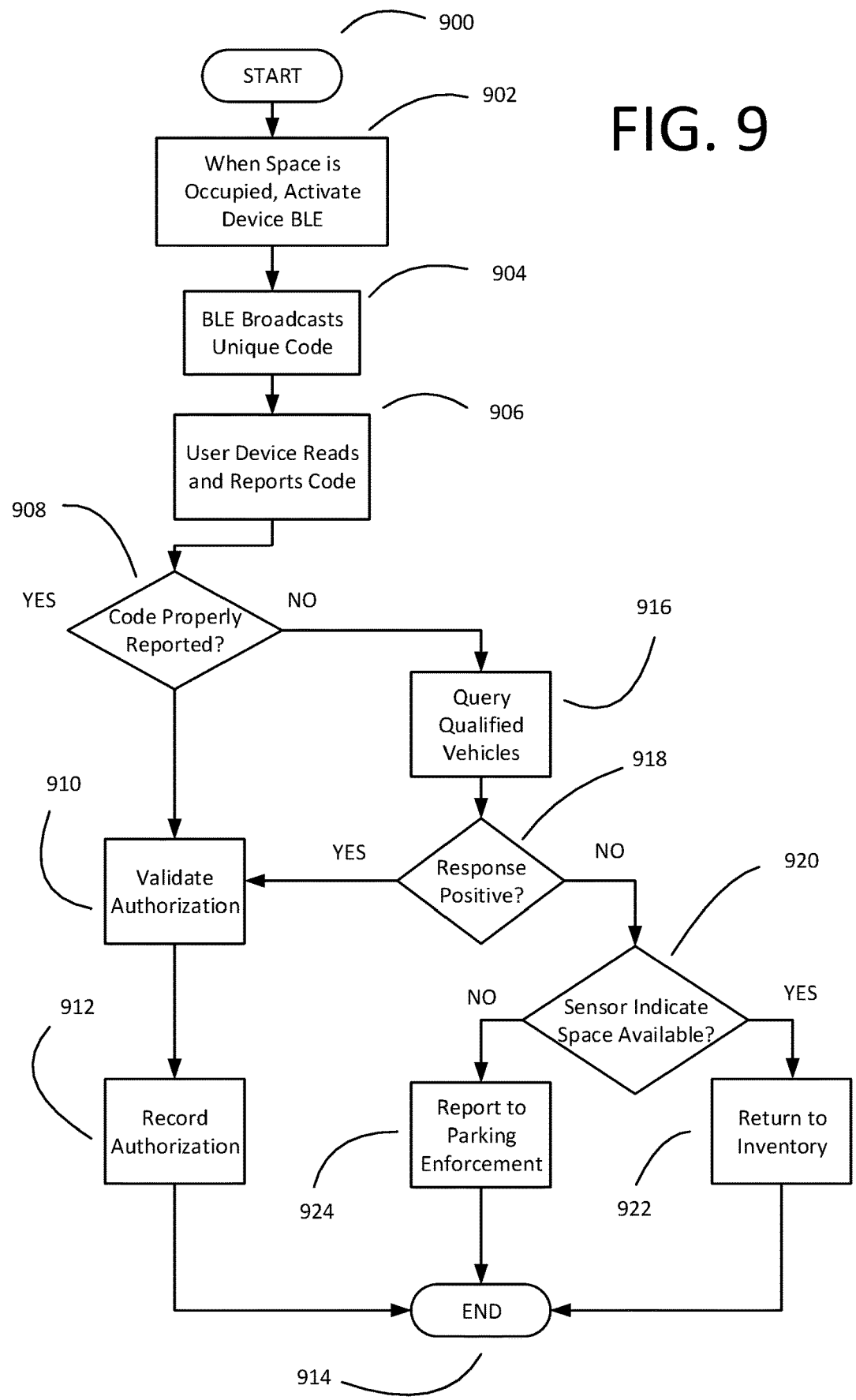
FIG. 9 is process flow diagram of an authorized parking enforcement sub-process consistent with certain embodiments of the present invention.

Turning now to FIG. 9, a process flow diagram of an authorized parking enforcement sub-process consistent with certain embodiments of the present invention is shown. At 900 the sub-process starts. When at 902 a privileged parking space is occupied, a locking device associated with the parking space activates a device BLE component. At 904, the device BLE component broadcasts a unique BLE code. The code is broadcast a short distance, such as, by way of non-limiting example, five to ten feet. At 906 the user device receives the beacon code and reports the code back to the RideFlag® data server. If at 908 the system determines that the code was properly reported, at 910 the user authorization is validated. At 912 the system records the authorization and at 914 the sub-process ends. If at 908 the system determines the code was not properly reported, at 916 the system sends a query to all qualified vehicles near the known location of user's vehicle. The query asks each qualified vehicle if one of them is in the parking space instead of the vehicle of the authorized user. If at 918 the system receives a positive response, indicating that a qualified vehicle occupies the parking space, the qualified vehicle's authorization is validated at 910 and the authorization is recorded at 912. If at 918 the system does not receive a positive response, at 920 the system checks whether one or more parking space sensors indicate that the parking space remains available, and not occupied by a vehicle. If at 920 the sensor indicates the space is available, at 922 the system returns the space to an inventory of available spaces. If at 920 the sensor indicates that the space is not available, and that an unauthorized vehicle occupies the parking space, the system at 924 reports the presence of an unauthorized vehicle in the parking space to Parking Enforcement.

While certain illustrative embodiments have been described, it is evident that many alternatives, modifications, permutations and variations will become apparent to those skilled in the art in light of the foregoing description.

We claim:

1. A method of verifying vehicular reward availability and confirming authorized vehicular reward use, comprising:
    collecting facial signatures as biometric data for all occupants in a passenger compartment utilizing one camera;
    validating individual occupants of a vehicle through analysis of biometric data collected from said occupants;
    evaluating and pre-approving the vehicle based in part on the validating;
    broadcasting location information from one or more sensors;
    verifying a user's one or more mobile devices and said one or more sensors are co-located;
    delivering communications from a data server to said one or more mobile devices authorizing access to a reward to park in a particular parking spot;
    selectively permitting access to said reward to any one of said occupants of a vehicle validated through analysis of biometric data for that occupant; and
    updating the inventory of reward availability in an electronic database maintained within said data server.

2. The method of claim 1 where the mobile devices include a device equipped with a radio frequency (RF) transmitter module.

3. The method of claim 1 where said one or more sensors operate on optic detection principles, magnetic detection principals, or both.

4. The method of claim 1 where the validating of vehicle occupants is achieved using biometric readings, or infra-red readings, or a combination of biometric and infra-red readings.

5. The method of claim 1, further comprising said data server receiving communication from a beacon associated with said one or more sensors.

6. The method of claim 1 where communications to said one or more mobile devices from said data server are received through a mobile application.

7. The method of claim 1 where the rewards consist of privileged access to designated parking spaces or designated vehicle lanes or both.

8. The method of claim 6 where the mobile application may be integrated into other mobile applications.

9. The method of claim 1 where said verifying co-location of said one or more mobile devices, said one or more sensors and/or a beacon is performed using a Global Positioning System (GPS).

10. A system of verifying vehicular reward availability and confirming authorized vehicular reward use, comprising:
    a user interface;
    a data server having a processor in wireless communication with one or more mobile devices;
    one camera collecting facial signatures as biometric data for all occupants in a passenger compartment;
    validating individual occupants of a vehicle through analysis of biometric data collected from said occupants;
    evaluating and pre-approving the vehicle based in part on the validation;
    broadcasting location information from one or more sensors;
    verifying said one or more mobile devices and said one or more sensors are co-located;
    delivering communications from said data server to said one or more mobile devices authorizing access to a reward to park in a particular parking spot;
    selectively permitting access to said reward to any one of said occupants of a vehicle validated through analysis of biometric data for that occupant; and
    updating the inventory of reward availability in an electronic database maintained within said data server.

11. The system of claim 10 where the mobile devices include a device equipped with a radio frequency (RF) transmitter module.

12. The system of claim 10 where said one or more sensors operate on optic detection principles, magnetic detection principals, or both.

13. The system of claim 10 where the validating of vehicle occupants is achieved using biometric readings, or infra-red readings, or a combination of biometric and infra-red readings.

14. The system of claim 10, further comprising said data server receiving communication from a beacon associated with said one or more sensors.

15. The system of claim 10 where communications to mobile devices from said data server are received through a mobile application.

16. The system of claim 10 where the rewards consist of privileged access to designated parking spaces or designated vehicle lanes or both.

17. The system of claim 15 where the mobile application may be integrated into other mobile applications.

18. The method of claim 10 where said verifying co-location of said one or more mobile devices, said one or more sensors and/or a beacon is performed using GPS.

* * * * *

UNITED STATES PATENT AND TRADEMARK OFFICE
CERTIFICATE OF CORRECTION

| | |
|---|---|
| PATENT NO. | : 10,964,215 B1 |
| APPLICATION NO. | : 16/694599 |
| DATED | : March 30, 2021 |
| INVENTOR(S) | : Michel Papineau et al. |

It is certified that error appears in the above-identified patent and that said Letters Patent is hereby corrected as shown below:

On the Title Page

Add -- (63) Related U.S. Application Data Continuation in part of application No. 15/878,308, filed Jan. 23, 2018, now Pat. No. 10,490,076; which is Continuation in part of application No. 15/789,503, filed on Oct. 20, 2017, now Pat. No. 10,354,458. --

Signed and Sealed this
Thirty-first Day of December, 2024

Derrick Brent
*Acting Director of the United States Patent and Trademark Office*